(12) United States Patent
Mielekamp et al.

(10) Patent No.: US 6,323,857 B1
(45) Date of Patent: *Nov. 27, 2001

(54) METHOD AND SYSTEM ENABLING USERS TO INTERACT, VIA MUTUALLY COUPLED TERMINALS, BY REFERENCE TO A VIRTUAL SPACE

(75) Inventors: Pieter M. Mielekamp; Robert Kettler, both of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,468

(22) Filed: Mar. 28, 1997

(30) Foreign Application Priority Data

Apr. 19, 1996 (EP) .................................................. 96201052

(51) Int. Cl.[7] .................................................. G06T 15/00
(52) U.S. Cl. .......................... 345/419; 345/473; 345/475; 345/428
(58) Field of Search .................................... 345/473, 474, 345/475, 419, 428

(56) References Cited

FOREIGN PATENT DOCUMENTS

0696018A2    2/1996   (EP) .

OTHER PUBLICATIONS

Rebensburg et al. "Distributing Virtual Worlds in a teleteching Environment", Proc. of the Fifth IEEE Computer Society Workshop on Future Trends of Distributed Computing Systems, 1995. pp. 66–75, Aug. 1995.*

* cited by examiner

*Primary Examiner*—Mark Zimmerman
*Assistant Examiner*—Philip H Stevenson
(74) *Attorney, Agent, or Firm*—Harold Tsiang

(57) ABSTRACT

Users control the movement of avatars through a virtual space. The system keeps track of the location of the avatars and forms a picture of the virtual space for each user. Users can select themselves to act as a cameraman. The picture of the virtual space around the location of the avatar is then transmitted separately to passive viewers via a broadcast channel. Conversation between the cameraman and other users is broadcast also via the broadcast channel. The picture broadcast has a visual detail which is finer than that of the pictures received by the various users individually; movements are reproduced therein in interpolated form and are adapted in such a manner that the avatars in the broadcast signal arrive at landmarks, in time.

18 Claims, 3 Drawing Sheets

Figure 1:
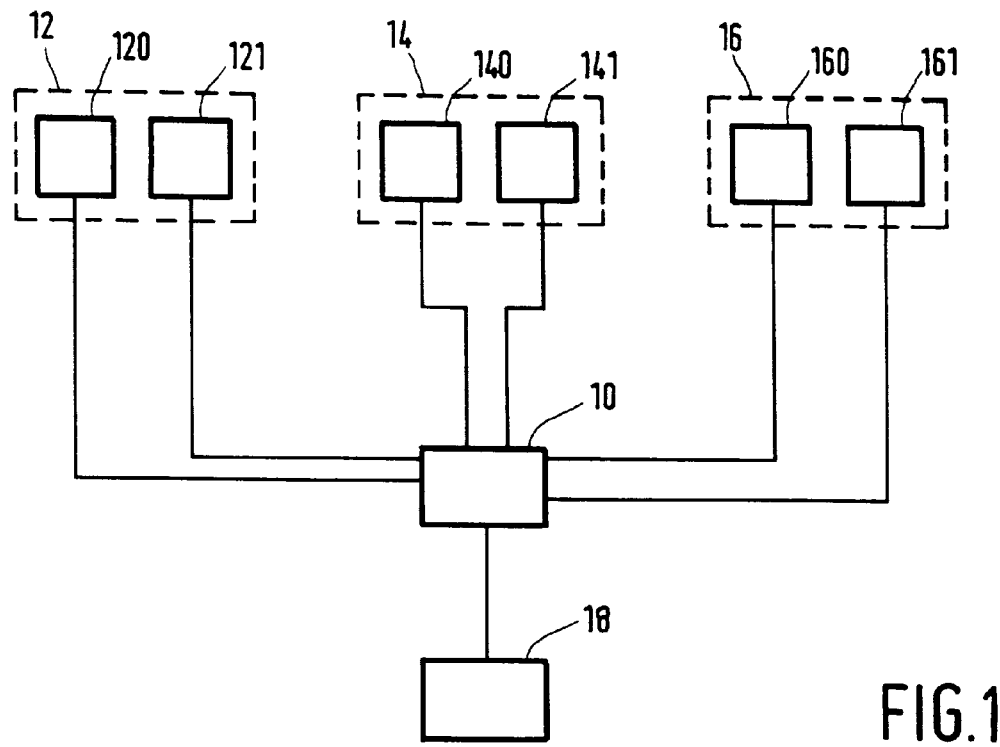

METHOD AND SYSTEM ENABLING USERS TO INTERACT, VIA MUTUALLY COUPLED TERMINALS, BY REFERENCE TO A VIRTUAL SPACE

The invention relates to a method enabling users to interact, via a set of interconnected terminals, by reference to a virtual space, which method includes the steps of associating each terminal of the set with a respective avatar in the virtual space and controlling a location of the respective avatar by means of commands received via the relevant terminal;

composing simulated observations of the virtual space, each for a respective one of the terminals of the set and making the simulated observations observable each by means of its respective on of the terminals, the avatars in the simulated observations being observable in conformity with their locations. The invention also relates to a system for carrying out the method. A method and a system of this kind are known from European Patent Application No. 663 771 (PHN 14.719, equivalent U.S. application Ser. No. 05/373,737).

When using the method disclosed in the cited publication, each participating person (user) is offered a visual impression of the virtual space on his or her terminal. In the virtual space each user is embodied by an avatar which is visually reproduced as a sprite, i.e. as a predetermined pixel pattern. Each user can control the location of his or her avatar in the virtual space. Consequently, the users can act as if they are present in the virtual space and hence can interact with other users.

EP 663 771 also states that an audio communication channel is established between two terminals when the locations of two avatars associated with the relevant two terminals approach one another. It has been found that such a possibility of selectively establishing contact on the basis of an observable impression of the virtual world is attractive to users. The virtual space offers the users a metaphor which stimulates social contacts.

It is inter alia an object of the invention to provide a method and a system of the kind set forth which enable non-users to perceive the interaction within the virtual space as it is experienced by users, without it being necessary for the non-users to have a terminal connection available and without the non-users having to control the location of avatars.

It is a further object of the invention to provide a method and a system of the kind set forth which enable the users to share their virtual space experience with non-users. The method of the invention is characterized in that it includes the steps of receiving a command which selects a terminal from the set;

selecting a sub-space of the virtual space on the basis of the location of the avatar associated with the selected terminal from the set;

composing a broadcast signal which represents a further simulated observation of exclusively the sub-space of the virtual space;

transmitting the broadcast signal distinctly from signals representing the simulated observations, the broadcast signal being transmitted via a broadcast channel for reception by further terminals outside said set of terminals, for making the further simulated observation observable for passive viewers. A user can thus be appointed as a "cameraman" in the virtual space by selecting his or her terminal. Reception of the broadcast signal gives non-users the opportunity of perceiving the virtual space as it is perceived by the cameraman.

In a version of the method of the invention different terminals are selected each time for successive time intervals, a respective sub-space of the virtual space being selected for each different terminal on the basis of the location of the respective avatar associated with the relevant terminal, the simulated observation in each time interval representing only an observation of the sub-space of the terminal selected for the relevant time interval. Thus, if they so wish, different users can share their experience as a cameraman. For the non-users the broadcast signal becomes more varied, because the location wherefrom the virtual space is rendered observable is alternately controlled by different users who possibly have different interests.

In a version of the method of the invention a relevant terminal which has been selected for at least one of the time intervals is selected in response to a command received via the relevant terminal. Thus, a user wishing to share his or her experiences can turn himself or herself into a cameraman via his or her terminal.

In a further version of the method of the invention the relevant terminal is selected in dependence on a distance between a reference location and the location of the avatar associated with the relevant terminal. The user can, for example send his or her avatar into a sub-space, in response to which the terminal of the user is selected.

A version of the method according to the invention includes the following steps keeping a channel for communication between the users of two terminals open and closed, respectively, when a distance between the locations of the avatars associated with these two terminals becomes smaller than a first predetermined distance or larger than a second predetermined distance, respectively;

making the communication via the channel perceivable also by means of the broadcast signal if one of the two terminals is selected. It has been found that notably the possibility of opening a communication channel, and the assisting of this possibility by selection of the communication partner by way of a location-dependent context in the virtual space, are very attractive to users. By passing on the communication on the channel via the broadcast channel, non-users can experience this attractive aspect of the interaction in the virtual space; it also enables the users to update non-users as to their interaction.

In a further version of the method of the invention the channel is an audio communication channel. It has been found that an audio communication channel is particularly attractive for use in combination with a virtual space. The audio communication, moreover, can be passed on very quickly without requiring substantial processing.

A version of the method of the invention includes the steps of forming for each terminal, as part of the simulated observation, a visual picture of a respective environment in the virtual space around the respective location of the avatar associated with the relevant terminal;

forming, as part of the further simulated observation, a further visual picture of the virtual space of the environment in the virtual space around the respective location of the avatar associated with the selected terminal. The visual representation is very suitable for illustrating the spatial relationships between the avatars in the virtual space.

In a version of the method of the invention the further visual picture is formed with a visual detail which is finer than that of the visual picture. The non-users are thus offered another, enhanced visual picture of the virtual world. The overhead required for this purpose is comparatively insignificant, because the picture can be shared by a large number of non-users and no interaction is required from non-users. Thus, objects such as buildings and avatars can be reproduced differently in the virtual space. For example, an object in the terminal picture could be composed from a limited set of basic symbols such as the ASCII set of characters or the set of teletext characters. The broadcast picture can then utilize bit maps which enable arbitrary pictures.

In a version of the method of the invention the virtual space contains a first and a second reference location, a displacement of at least one of the avatars from the first to the second reference location in the further simulated picture being reproduced by interpolation of a corresponding displacement of the at least one avatar in the visual picture in finer steps. Users can often control the avatars in a coarsely quantized manner only, for example in discrete steps between locations in which characters from the set of characters can be reproduced in the visual picture, or only with a limited number of movement directions such as the horizontal and the vertical movement direction. In the further visual picture this movement can be reproduced in a refined manner, for example by accumulating a series of movement steps and by subsequently reproducing the uniform movement along a straight line between the start and finish of the series of movement steps.

In a further version of the method of the invention a connection between two parts of the virtual space is reproduced, in relation to the two parts in the visual picture, with a dimension other than in the further visual picture, a speed of movement of the avatar in the further visual picture being reproduced with an adaptation in relation to a speed of movement of the avatar in the virtual space, the adaptation being dependent on whether or not the avatar is present in the connection and the adaptation being executed in such a manner that the periods of time required for crossing the connection in the visual picture and in the further visual picture are substantially the same. The two parts are, for example door areas in which the avatar can enter a door. In response to entering, the context in the visual picture is changed, for example from the reproduction of an exterior of a building to a picture of an interior. In the further visual picture the finer imaging, or the finer reproduction of movement of the avatars, enables, for example the door areas to be comparatively smaller than the connection between the door areas. The described steps ensure that in that case the times of arrival at the door areas in the visual picture correspond to those in the further visual picture.

These and other aspects of the invention will be apparent from and elucidated with reference to the embodiments described hereinafter.

Figure 2:
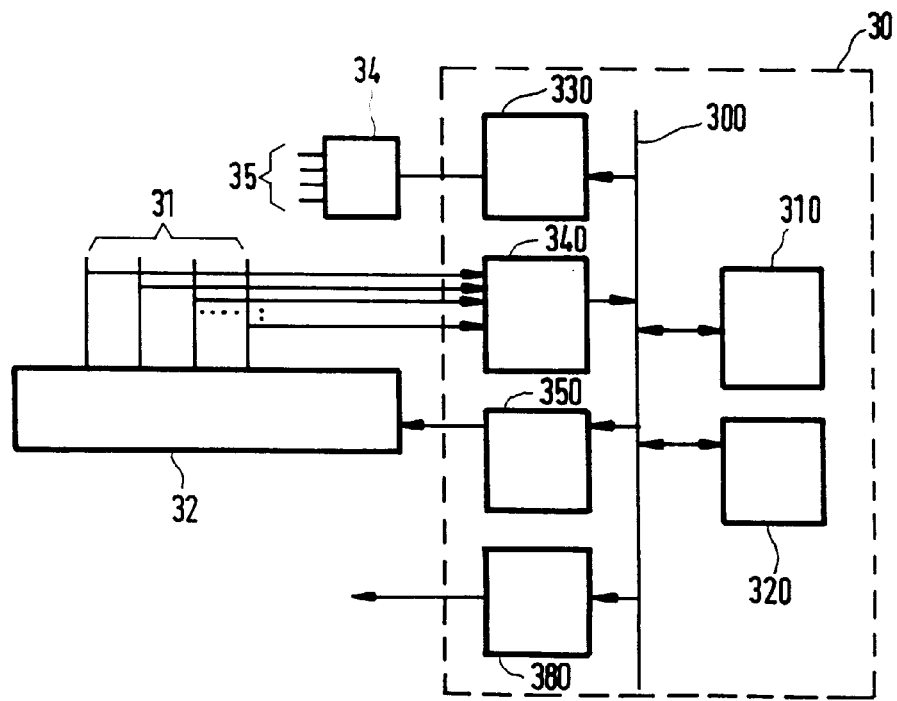
Figure 3:
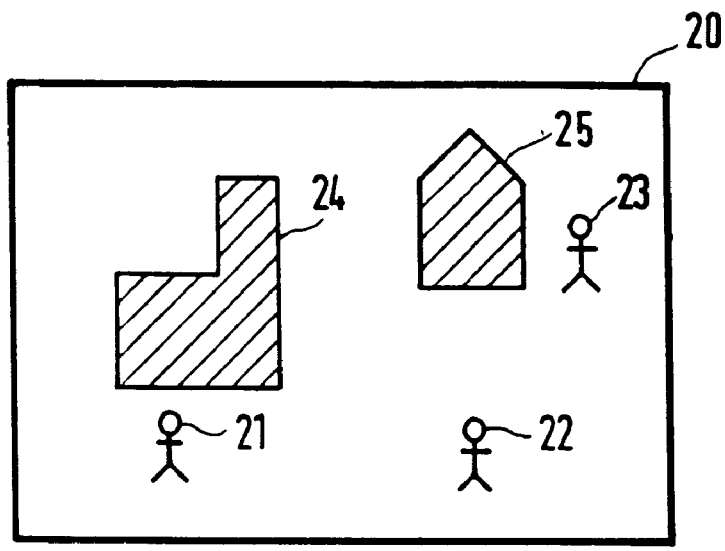
Figure 4:
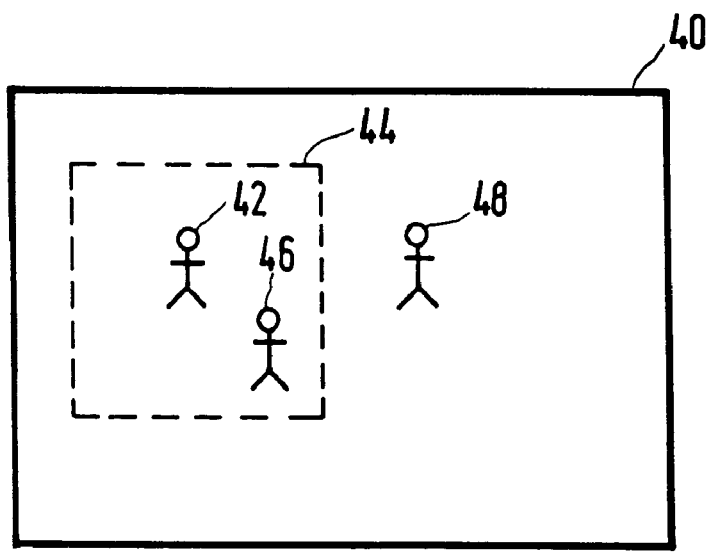
Figure 5A:
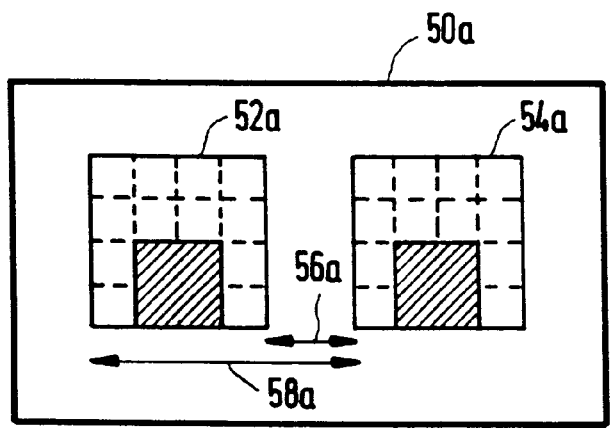
Figure 5B:
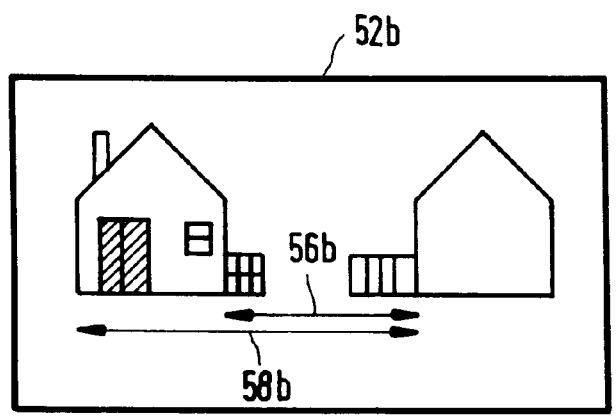
Figure 5C:
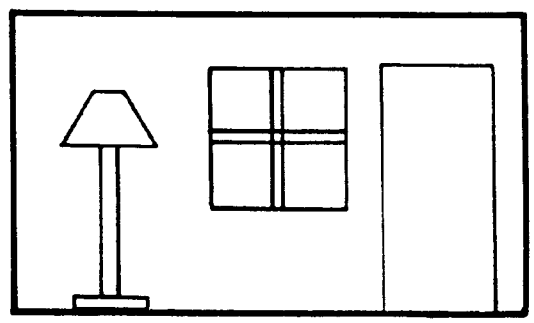

In the drawings:

FIG. 1 shows a system enabling user interaction by reference to a virtual space, FIG. 2 shows a server for establishing connections between terminals, FIG. 3 shows a picture of a virtual space, FIG. 4 shows a picture of a virtual space with an audio range, and FIGS. 5a–c show further pictures of a virtual space.

FIG. 1 shows a system enabling users to interact by reference to a virtual space. The system includes a server 10 which is connected to a number of terminals 12, 14, 16 and a broadcast device 18. Each terminal 12, 14, 16 includes a picture display apparatus 120, 140, 160 and a control/sound pick-up device 121, 141, 161 which are connected to the server 10. The picture display apparatus 120, 140, 160 is, for example a television apparatus with a teletext facility. The control/audio pick-up device 121, 141, 161 is, for example a telephone set. In another example, the picture display apparatus 120, 140, 160 and the control/audio pick-up device 121, 141, 161 are accommodated together in a personal computer.

FIG. 2 shows a server for establishing connections between terminals. The server includes a processing unit 30 and a switching matrix 32 with inputs 31 and is connected to a picture information distribution system 34 having outputs 35.

The processing unit 30 includes a bus 300 whereto there are connected: a central processing unit 310, a memory 320, a command receiving unit 340, a switching matrix control unit 350, a picture information generator 330, and a broadcast signal generator 380.

The system enables the users to interact with one another during operation as if they were present in a virtual space. Each user corresponds to an "avatar", being a (virtual) embodiment of the user which can move through the virtual space under the control of the user. In order to enable interactive user control, the server 10 generates signals which are converted into observable, simulated pictures of the virtual space in the terminals 12, 14, 16.

FIG. 3 shows an example of such a picture 20 in visual form. The picture 20 shows a number of buildings 24, 25 and a number of sprites 21, 22, 23. Each sprite 21, 22, 23 constitutes a visual picture of an avatar.

The memory 320 of the processing unit 30 stores location coordinates for each terminal 12, 14, 16, which coordinates represent the location of the avatar of the users of respective terminals (to be referred to hereinafter as the avatar associated with the terminal, because the system distinguishes users only as operators of specific terminals). A user can apply commands to the server 10 via a terminal 12, 14, 16. The processing unit 30 of the server 10 receives the commands by way of the command receiving unit 340. The commands are applied to the central processing unit 310 which, in response thereto, changes the coordinates of the avatar associated with the terminal in the memory 320. The coordinates are read from the memory 320 so as to be used in the image information generator 330. The image information generator 330 processes the coordinates of the avatars in the picture information generated. The picture information, therefore, represents the buildings 24, 25 and the sprites 21, 22, 23 in conformity with the locations of the avatars.

Generally speaking, the virtual space is much larger than can be reproduced, for example in one picture. A single picture, therefore, only shows a small part of the virtual space. If the avatar associated with a terminal travels too far from the center of the picture, the picture information generator 330 can shift the location of the virtual space reproduced at the center of the picture for said terminal, so that the picture of the avatar is moved closer to the center again. The positions in the picture where the other avatars and buildings are reproduced are then shifted accordingly. Thus, each user can obtain an independent picture of the virtual space and can explore the entire virtual space by moving.

The picture information generator 330 applies the picture information to the picture information distribution system 34 which applies the picture information on its outputs 35 to the various terminals 12, 14, 16 which reproduce the picture. The picture information generator 330 may be, for example a video signal processor which places the picture information in various teletext pages of a video signal; the picture information distribution system is, for example a cable network which applies the video signal to television sets used as parts of the terminals.

The processing unit 30 generates a broadcast signal in addition to the picture information for the various terminals. To this end, a terminal is selected on the basis of a control command, for example originating from one of the terminals 12, 14, 16. The coordinates of the avatars are read from the memory 320 and applied to the broadcast signal generator 380. The broadcast signal generator 380 composes an own picture of the virtual space, containing reproductions of the buildings 24, 25 and the sprites 21, 22, 23 in conformity with the locations of the avatars.

The location of the virtual space reproduced at the center of the picture by the broadcast signal generator 380 is then chosen so that the avatar associated with the selected terminal remains in the picture. Via a broadcast channel, the picture of the virtual space is transmitted with a broadcast signal. This broadcast signal may be, for example the video signal whereby the picture information for the various terminals is transmitted in the form of teletext pages. This video signal can then also be dispatched via a cable network.

Selection of the terminal 12, 14, 15 can take place, for example if the avatar associated with the terminal is sent into a given part of the virtual space. This part of the virtual space then serves, so to speak, as a storage bin for a camera. In visual pictures of the virtual space the avatar of the selected terminal can be distinguished from the other avatars by reproducing it, for example with a camera or any other special visual symbol. The users can then determine when their activities enter the broadcast signal.

The terminals 12, 14, 16 may also be provided with a connection for the transfer of audio signals such as user speech. These signals may be transmitted, for example via the same connection as the control commands. The audio signals can be used to form an audio rendition of the virtual space. This audio rendition can be made audible via the terminal 12, 16, 18 of a user. In the case of an audio rendition the user hears, via the relevant terminal, the sounds as they would be heard by his avatar in the virtual space. For example, the audio rendition contains background sounds which are characteristic of the location of the avatar (for example, traffic noise) and arrive at the terminal from a storage medium. The audio rendition also contains, for example sounds from other terminals. These sounds are passed on, for example, only if the avatars associated with the other terminals are within a given distance from the avatar associated with the terminal via which the sound is reproduced.

Forms of communication other than speech are also feasible. For example, the user of a given terminal could enter typed text via the given terminal. This text is subsequently reproduced on terminals whose associated avatars are in locations in the vicinity of the avatar of the given terminal.

FIG. 4 is a visual representation 40 of a virtual space with an audio range. This visual representation 40 contains pictures of three avatars 42, 46, 48 and an audio range 44 around one of the avatars 42. Via the terminal associated with the one avatar 42, sound is reproduced which originates from the terminals associated with avatars 46 which are present within the audio range 44, but the sound originating from terminals associated with avatars 48 which are situated outside the audio range 44 is not reproduced.

The server generates the audio rendition, for example by means of the switching matrix 32. The latter receives the audio signals from the various terminals (together with control commands). On the basis of the coordinates of the avatars stored in the memory 320 the central processing unit 310 determines which avatars are present in the audio range of one another; it controls the switching matrix 32 in such a manner that corresponding connections are established between the connections for various terminals. As a result, the sound can be transferred from selected terminals to other terminals.

The audio rendition of the virtual space can be transferred, additionally or exclusively, by means of the broadcast signal. To this end, the audio signals are selected which originate from the terminals associated with avatars situated within the audio range of the avatar of the selected terminal. These audio signals and the audio signal of the selected terminal itself are applied to the broadcast signal generator 380 in which they are combined so as to form an audio rendition which is transmitted as a broadcast signal. This can be realized, for example in the audio channel of the video signal whereby the visual pictures are dispatched as a teletext signal for various terminals.

The audio rendition dispatched via the broadcast signal, therefore, is dependent on the location of the avatar associated with the selected terminal. This audio rendition can in principle be transmitted as a broadcast signal, i.e. without associated visual picture. Those perceiving the broadcast signal, however, are given a much more comprehensible impression of the virtual space if the visual picture and the audio rendition are both included in the broadcast signal.

The terminals 12, 14, 16 preferably compose the visual pictures from a limited set of characters. For example when teletext is used, the set of characters available in existing television sets incorporating a teletext facility is employed. The image information generator 330 in that case need generate only the codes for the characters to be displayed, said codes being applied to the terminals 12, 14, 16. The terminals 12, 14, 16 convert the codes into visual characters in conformity with an internally available table of characters. Thus, existing, technically simple terminals can be used and, moreover, the bandwidth required is limited.

The broadcast signal generator 380 preferably generates a visual picture of the virtual space in the form of a bit map comprising individually controllable pixels. Consequently, the usable shapes are not restricted to a limited set of characters. In the broadcast signal, a visual picture of the virtual space can thus be formed which has a higher image quality and shows more details than the visual pictures displayed on the various terminals 12, 14, 16.

The avatars have limited access to the virtual space. For example, avatars may not perform movements passing through walls of buildings in the virtual space. Location control operations for the avatars by the terminals 12, 14, 16 which would make the avatar perform such a movement will be filtered out by the central processing unit 310 and will not be taken up in the coordinates of the location of the avatar which are updated in the memory 320.

In the visual reproduction of the virtual space the avatars may not be displayed in positions in the visual picture which are marked as being inaccessible, such as positions in which walls are reproduced. Because of the use of a limited character set in the terminals 12, 14, 16, therefore, rather coarse accessible and inaccessible areas will arise. The distances between the walls of buildings will be a multiple of a block size that can be filled by a character. Portals, being regions in the virtual space which must be traversed by an avatar in order to move from one part of the virtual space to another, will require a minimum, visually recognizable dimension.

Because of the refined rendition in the broadcast signal, however, a finer distinction can also be made between accessible and non-accessible positions.

FIGS. 5a, 5b and 5c show an exaggerated example of such different pictures. FIG. 5a shows a visual picture 50a which contains pictures 52a, 54a of two houses for display by means of a terminal 12, 14, 16. The pictures 52a 54a are composed of elementary blocks whose boundaries are denoted by dashed lines. FIG. 5b shows a corresponding visual picture 50b which contains other, more detailed pictures 52b, 54b of the houses. FIG. 5c shows an interior of a house. The system switches over from the reproduction of the houses to the reproduction of the interior when an avatar is moved to the location of the door opening by the control commands. The position of the picture of notably the avatar of the user serving as a cameraman should then be situated in the door opening in both pictures.

Because of the greater detail, the ratios of the distances between different points differ, such as the left-hand side and the right-hand side of the houses, the left-hand side and the right-hand side of the doors, the distances between houses etc. For example, consider the distance 56a,b between the left-hand and the right-hand pictures of the houses and the distance 58a,b between the right-hand sides of the houses. The ratio of the distances 56a, 58a in one visual picture 50a deviates from the ratio of the corresponding distances 56b, 58b in the other visual picture 50b.

In order to derive full benefit therefrom, each of the avatars is preferably reproduced on the terminals 12, 14, 16 and in the broadcast signal with an own location-position mapping which maps to the location of an avatar in the virtual space a position of the picture of the avatar in the visual picture. The own mappings are then such that the positions of corresponding reference points in the various visual pictures, such as edges of buildings and doors etc., correspond to identical locations in the virtual space.

In an example of such mapping, reference points $r_i$ from a two-dimensional virtual space are mapped onto points $p_i$ in the visual picture reproduced by the terminals 12, 14, 16, and onto points $q_i$ reproduced in the broadcast signal. An avatar in an arbitrary location x, situated between three points $r_1$, $r_2$, $r_3$ in the virtual space so that there are coefficients $\alpha_2$, $\alpha_3$ with $x=r_1+\alpha_2(r_2-r_1)+\alpha_3(r_3-r_1)$, is then mapped onto the position $y=p_1+\alpha_2(p_2-p_1)+\alpha_3(p_3-p_1)$ in the visual picture for the terminals and onto the position $z=q_1+\alpha_2(q_2-q_1)+\alpha_3(q_3-q_1)$ in the visual picture for the broadcast signal. However, other, for example non-linear mappings can also be used.

It is thus ensured that the avatar, given its location in the virtual space, in both visual pictures is mapped in a position which can be visually recognized as being accessible.

Generally speaking, the own pictures of the virtual space for the terminals 12, 14, 16 and the broadcast signal, therefore, are such that a non-uniform relationship arises between the positions in the visual picture on the terminals 12, 14, 16 and the positions in the visual picture in the broadcast signal. A non-uniform relationship is to be understood to mean herein that the ratios of different distances between different points in one picture deviate from the ratios of distances between corresponding positions in the other picture.

The positions in which the avatars are reproduced in the visual picture for the terminals 12, 14, 16 will be rather coarsely quantized, generally speaking, and be stepped, for example because they can be present only in discrete character locations. Finer quantization is possible in the visual picture in the broadcast signal. In order to achieve smoother movements in the visual picture in the broadcast signal, the broadcast signal generator 380 preferably buffers a number of movement steps of the avatars as reproduced in the visual pictures for the terminals 12, 14, 16.

The broadcast signal generator 380 combines the buffered movement steps so as to form a composite movement along substantially a straight line with the same start and termination locations as the buffered movement steps, and reproduces the composite movement in the visual picture in the broadcast signal. Therefore, this composite movement is smoother than the movements displayed by the terminals 12, 14, 16, but it is also slightly delayed. The composite movement can be reproduced, for example uniformly (constant speed) or with an acceleration at the beginning and a deceleration at the end, thus making the movement appear more natural.

Instead of the above non-uniform mapping of the locations of the avatars onto positions in a visual picture, the composite movement can also be used. Movements between reference points are then reproduced as composite movements. The avatars of other users can then also be used as reference points, so that the avatar arrives at that area in time and a developing conversation can be reproduced without delay.

Even though the invention has been described in terms of an embodiment involving teletext television sets for the reproduction of pictures and telephones for controlling the avatars, evidently, that is merely an embodiment which is attractive because most potential users already own the necessary hardware. Other embodiments, utilizing other display devices such as computer monitors, and other connections, such as computer networks, can also be simply implemented. The described server also is merely an example; for example, a number of parallel processes can be used instead, or the storage and computational capacity required can be distributed among the terminals.

What is claimed is:

1. A method enabling users to interact, via a set of interconnected terminals, by reference to a virtual space, which method includes the steps of associating each terminal of the set with a respective avatar in the virtual space and controlling a location of the respective avatar by means of commands received via the relevant terminal;

composing simulated observations of the virtual space, each for a respective one of the terminals of the set and making the simulated observations observable each by means of its respective one of the terminals, the avatars in the simulated observations being observable in conformity with their locations, characterized in that the method includes the steps of:

receiving a command which selects a terminal from the set;

selecting a sub-space of the virtual space on the basis of the location of the avatar associated with the selected terminal from the set;

composing a broadcast signal which represents a further simulated observation of exclusively the sub-space of the virtual space;

transmitting the broadcast signal distinctly from signals representing the simulated observations, the broadcast signal being transmitted via a broadcast channel for reception by further terminals outside said set of terminals, for making the further simulated observation observable for passive viewers;

wherein different terminals are selected each time for successive time intervals, a respective sub-space of the virtual space being selected for each different terminal on the basis of the location of the respective avatar associated with the relevant terminal, the simulated observation in each time interval representing only an observation of the sub-space of the terminal selected for the relevant time interval.

2. A method as claimed in claim 1, in which a relevant terminal which has been selected for at least one of the time intervals is selected in response to a command received via the relevant terminal.

3. A method as claimed in claim 2, in which the relevant terminal is selected in dependence on a distance between a reference location and the location of the avatar associated with the relevant terminal.

4. A method as claimed in claim 1, including the following steps keeping a channel for communication between the users of two terminals open and closed, respectively, when a distance between the locations of the avatars associated with these two terminals becomes smaller than a first predetermined distance and larger than a second predetermined distance, respectively;

making the communication via the channel perceivable also by means of the broadcast signal if one of the two terminals is selected.

5. A method as claimed in claim 4, in which the channel is an audio communication channel.

6. A method as claimed in claim 1 which includes the steps of forming for each terminal, as part of the simulated observation, a specific visual picture of a respective environment in the virtual space around the respective location of the avatar associated with the relevant terminal;

forming, as part of the further simulated observation, a specific further visual picture of the virtual space of the environment in the virtual space around the respective location of the avatar associated with the selected terminal.

7. A method as claimed in claim 6, in which the further visual picture is formed with a visual detail which is finer than that of the visual picture.

8. A method as claimed in claim 6, in which the virtual space contains a first and a second reference location, a displacement of at least one of the avatars from the first to the second reference location in the further simulated picture being reproduced by interpolation of a corresponding displacement of the at least one avatar in the visual picture in finer steps.

9. A method as claimed in claim 8, in which a connection between two parts of the virtual space is reproduced, in relation to the two parts in the visual picture, with a dimension other than in the visual picture, a speed of dimension other than in the visual picture, a speed of movement of the avatar in the further visual picture being reproduced with an adaptation in relation to a speed of movement of the avatar in the virtual space, the adaptation being dependent on whether or not the avatar is present in the connection and the adaptation being executed in such a manner that the periods of time required for crossing the connection in the visual picture and in the further visual picture are substantially the same.

10. A system for implementing interactions between users, including a set of interconnected terminals;

means for updating a state in a virtual space, each terminal of the set having a respective avatar in a location in the virtual space;

means for receiving user commands via the terminals and for controlling the locations of the avatars in dependence on the user commands;

means for making respective simulated observations of the virtual space observable via the terminals, the avatars in the simulated observation being observable in conformity with their locations, characterized in that the system includes means for receiving a further user command which selects a terminal and for selecting a sub-space of the virtual space on the basis of the location of the respective avatar associated with the selected terminal;

a connection to a broadcast signal;

means for transmitting, distinctly from signals representing the simulated observations, a broadcast signal which represents a further simulated observation of exclusively the sub-space of the virtual space, the means for transmitting the broadcast signal via the broadcast channel for reception by further terminals outside said set of terminals, for making the further simulated observation observable for passive viewers;

wherein the means for receiving the further user command are arranged to select different terminals each time for successive time intervals, and to select for each different terminal a respective sub-space of the virtual space on the basis of the location of the respective avatar associated with the relevant terminal, and wherein the simulated observation in each time interval represents only an observation of the sub-space of the terminal selected for the relevant time interval.

11. A system as claimed in claim 10, in which a relevant terminal which has been selected for at least one of the time intervals is selected in response to a command received via the relevant terminal.

12. A system as claimed in claim 11, in which the relevant terminal is selected in dependence on a distance between a reference location and the location of the avatar associated with the relevant terminal.

13. A system as claimed in claim 10, including a channel for communication between the users;

means for keeping the channel for communication open and closed, respectively, when a distance between the locations of the avatars associated with the relevant two terminals becomes smaller than a first predetermined distance or larger than a second predetermined distance, respectively;—in which the means for transmission make the communication via the channel observable also by means of the broadcast signal if one of the two terminals is selected.

14. A system as claimed in claim 13, in which the channel for communication is an audio communication channel.

15. A system as claimed in claim 10, in which the simulated observation contains, for each terminal, a specific visual picture of a respective environment in the virtual space around the respective location of the avatar associated with the relevant terminal;

and the means for transmission form, for at least one of the time intervals as part of the further simulated observation, a specific further visual picture of the virtual space of the environment in the virtual space around the respective location of the avatar associated with the terminal selected in the at least one of the time intervals.

16. A system as claimed in claim 13, in which the further visual picture is formed with a visual detail which is finer than that of the visual picture.

17. A system as claimed in claim 13, in which the virtual space contains a first and a second reference location, a displacement of at least one of the avatars from the first to the second reference location in the further simulated picture being reproduced by interpolation of a corresponding displacement of the at least one avatar in the visual picture in finer steps.

18. A system as claimed in claim 17, in which a connection between two parts of the virtual space is reproduced, in relation to the two parts in the visual picture with a dimension other than in the further visual picture, a speed of movement of the avatar in the further visual picture being reproduced with an adaptation in relation to a speed of movement of the avatar in the virtual space, the adaptation being dependent on whether or not the avatar is present in the connection and the adaptation being executed in such a manner that the periods of time required for crossing the connection in the visual picture and in the further visual picture are substantially the same.

* * * * *